(12) United States Patent
Liang et al.

(10) Patent No.: US 12,251,042 B2
(45) Date of Patent: Mar. 18, 2025

(54) FRENCH PRESS PLUNGER ASSEMBLY

(71) Applicants: Shuijin Liang, Tianjin (CN); Sterling Enyu Lyang, Thornhill (CA); Zhujuan Yang, Thornhill (CA); Jian Liang, Thornhill (CA)

(72) Inventors: Shuijin Liang, Tianjin (CN); Sterling Enyu Lyang, Thornhill (CA); Zhujuan Yang, Thornhill (CA); Jian Liang, Thornhill (CA)

(*) Notice: Subject to any disclaimer, the term of this patent is extended or adjusted under 35 U.S.C. 154(b) by 817 days.

(21) Appl. No.: 17/464,202

(22) Filed: Sep. 1, 2021

(65) Prior Publication Data

US 2022/0361703 A1 Nov. 17, 2022

Related U.S. Application Data

(63) Continuation-in-part of application No. 16/575,434, filed on Sep. 19, 2019, now abandoned.

(51) Int. Cl.
| | |
|---|---|
| *A47J 31/20* | (2006.01) |
| *B01F 27/112* | (2022.01) |
| *B01F 27/83* | (2022.01) |
| *B01F 27/906* | (2022.01) |
| *B01F 31/44* | (2022.01) |
| *B01F 35/32* | (2022.01) |
| *B01F 101/14* | (2022.01) |

(52) U.S. Cl.
CPC ............ *A47J 31/20* (2013.01); *B01F 27/112* (2022.01); *B01F 27/83* (2022.01); *B01F 27/906* (2022.01); *B01F 31/44* (2022.01); *B01F 35/3202* (2022.01); *B01F 2101/14* (2022.01)

(58) Field of Classification Search
CPC ............. A47J 31/42; A47J 31/20; A47J 31/00
USPC ......... 99/279, 283, 286, 287, 297, 298, 299, 99/300, 316, 317, 318, 319, 321
See application file for complete search history.

(56) References Cited

U.S. PATENT DOCUMENTS

2018/0064284 A1\* 3/2018 Ryan .................. A47J 31/4407

\* cited by examiner

*Primary Examiner* — Phuong T Nguyen
(74) *Attorney, Agent, or Firm* — Gulf Coast Intellectual Property Group

(57) ABSTRACT

A French press rod assembly configured to be operably engaged with a French press coffee pot wherein the French press rod assembly provides an element to engage therewith to stabilize the French press rod assembly during removal of the filter screen. The French press rod assembly includes a shaft having a first end and a second end. A handle is secured to the first end of the shaft and a filter screen is removably secured to the second end of the shaft. The shaft has surroundably mounted thereto proximate the second end an engagement member. A flow member is rotatably secured to the shaft wherein the flow member is intermediate the second end of the shaft and the engagement member. In a preferred embodiment of the flow member, the flow member is rotatably mounted to the shaft and includes a plurality of blades.

5 Claims, 2 Drawing Sheets

FRENCH PRESS PLUNGER ASSEMBLY

CROSS REFERENCE TO RELATED APPLICATIONS

This application is a continuation-in-part of U.S. patent application Ser. No. 16/575,434 filed, Sep. 19, 2019, entitled, French Press Plunger Rod Assembly, in the name of Shuijin Liang, which is hereby incorporated for reference.

FIELD OF THE INVENTION

The present invention relates generally to French press coffee apparatus, more specifically but not by way of limitation, a French press coffee plunger having a shaft with a first end and a second end wherein the second end includes a filtration screen and further includes a flow member secured to the shaft operable to create a vortex flow.

BACKGROUND

In the United States the coffee industry is a multi-billion dollar per year industry. The expansion of the coffee market has resulted in the proliferation of specialty coffees and devices. As individuals develop more and more unique preferences, their needs for various types of coffee and coffee making apparatus has expanded. Coffee making apparatus are well known in the art and can range from commercial cappuccino-espresso machine to simple coffee percolators that are utilized in the home.

One type of coffee maker that has grown in popularity is the French press coffee machine. The French press coffee machine is a cylindrical pot that has movably secured therein a plunger rod that is configured to move within the pot in an upwards-downwards direction. The plunger rod includes a handle at one end and a filter screen at the opposing end thereof. Hot water and ground coffee beans are placed in the pot and the filter screen is presses the hot water through the ground coffee beans in order to produce a coffee that is earthy and rich in taste. Subsequent utilization of the filter screen the screen requires cleaning for the next use. Commonly the filter screens are secured to the plunger rod utilizing a screw nut, which must be rotated for removal thereof. All existing plungers however do not have a specific element to create a particular flow pattern that would be optimal for creating a normalized distribution of the coffee within the French press coffee machine.

Accordingly, there is a need for a French press plunger rod assembly configured to provide improved engagement therewith and further provide an element that is operable to create a particular flow pattern within the interior volume of the French press coffee machine.

SUMMARY OF THE INVENTION

It is the object of the present invention to provide a French press plunger rod assembly that is configured to be operably engaged with a French press pot wherein the present invention includes a shaft having a first end and a second end.

Another object of the present invention is to provide a French press plunger rod assembly wherein the present invention includes a handle operably engaged to the first end of the shaft.

A further object of the present invention is to provide a French press plunger rod assembly that is configured to be operably engaged with a French press pot that includes a filter screen removably secured to the second end of the shaft.

Still another object of the present invention is to provide a French press plunger rod assembly that further includes an engagement member secured to the shaft proximate the second end of the rod.

An additional object of the present invention is to provide a French press plunger rod assembly that is configured to be operably engaged with a French press pot wherein the shaft further includes a flow member secured thereto proximate the second end of the shaft and below the engagement member.

Yet a further object of the present invention is to provide a French press plunger rod assembly wherein the flow member can be mounted in a first technique and a second technique.

Another object of the present invention is to provide a French press plunger rod assembly that is configured to be operably engaged with a French press pot wherein the first technique for the flow member the flow member is configured to rotate about the shaft.

Still an additional object of the present invention is to provide a French press plunger rod assembly wherein the flow member includes a plurality of blades in one embodiment thereof To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
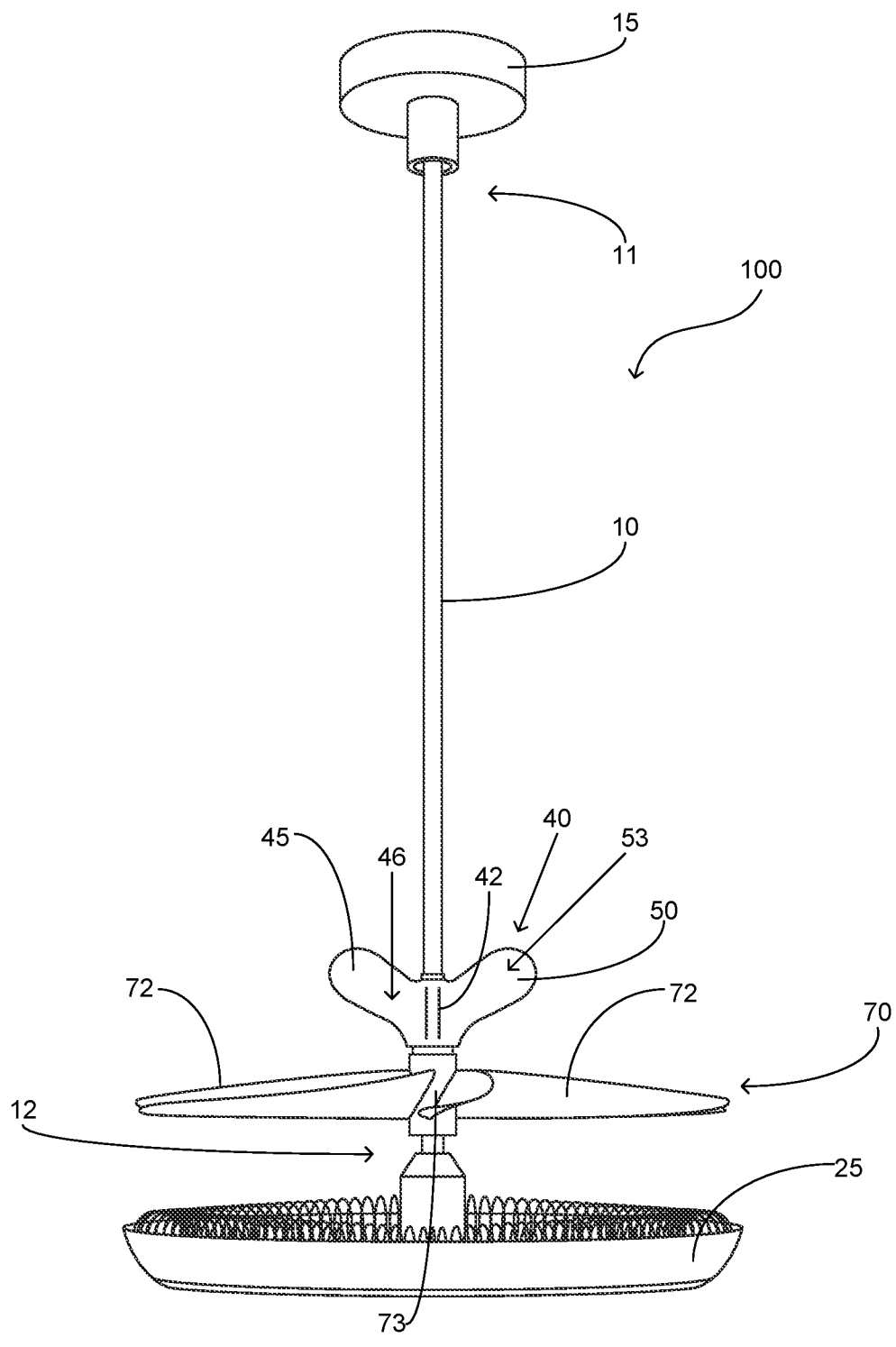
FIG. 1 is a side view of a preferred embodiment of the present invention.
Figure 2:
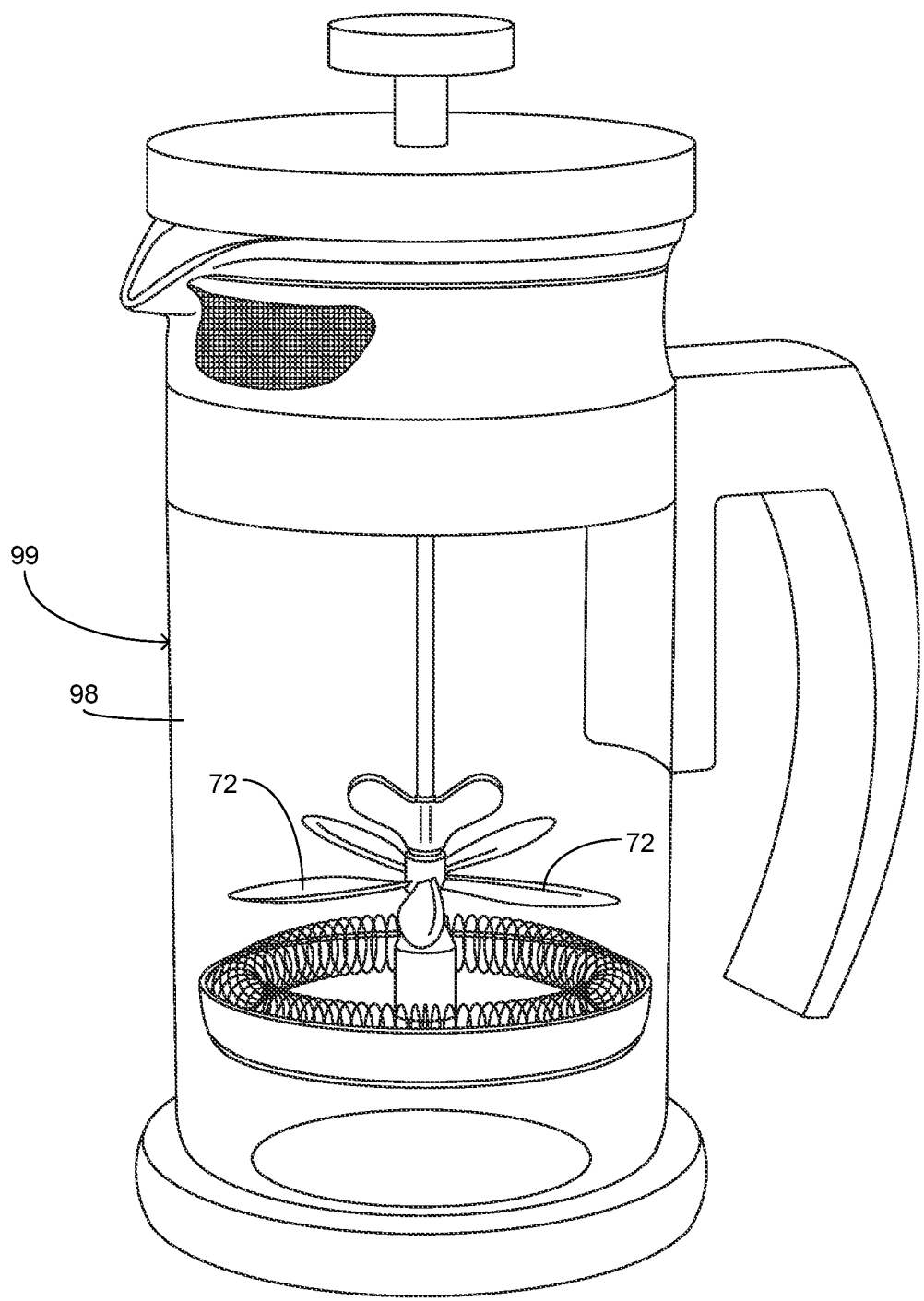
FIG. 2 is a perspective view of the present invention operably coupled with a French press coffee pot.

Referring now to the drawings submitted herewith, wherein various elements depicted therein are not necessarily drawn to scale and wherein through the views and figures like elements are referenced with identical reference numerals, there is illustrated a French press plunger rod assembly 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular the Figures submitted as a part hereof, the French press plunger rod assembly 100. The French press plunger rod assembly 100 includes a shaft 10 being manufactured from rigid material such as but not limited to metal. The shaft 10 includes a first end 11 and second end 12. It should be understood within the scope of the present invention that the shaft 10 could be manufactured in alternate lengths in order to accommodate various sizes of French press pots.

Secured to the first end 11 of the shaft 10 is handle 15. Handle 15 is secured to the first end 11 utilizing suitable durable techniques. The handle 15 is manufactured from a durable material such as but not limited to metal or plastic. While the handle 15 is illustrated herein as being annular in shape it should be understood within the scope of the present invention that the handle 15 could be formed in numerous alternate shapes and sizes.

A filter screen 25 is removably secured to the shaft 10 proximate second end thereof. The filter screen 25 is annular in shape so as to mateably accommodate the interior of a conventional French press coffee pot 99. The filter screen 25 is removably secured to the second end 12 of the shaft 10 utilizing suitable durable fasteners such as but not limited to a screw nut in order to facilitate the rotatable removal of the filter screen 25.

Immovably secured to the shaft 10 proximate the second end thereof is an engagement member 40. Engagement member 40 is secured to the shaft 10 utilizing suitable durable techniques that are operable to inhibit the movement thereof with respect to the shaft 10. The engagement member 40 includes a first lateral wing member 45 and a second lateral wing member 50 integrally formed with the central portion 42. The central portion 42 is surroundably mounted to shaft 10 and the engagement member 40 is manufactured from a durable material such as but not limited to metal. The first lateral wing member 45 extends outward from the central portion 42 and includes surface area 46 of suitable size so as to accommodate a portion of a human hand or finger thereon. It should be understood within the scope of the present invention that an alternative embodiment of the engagement member 40 could be constructed without the central portion 42.

The second lateral wing member 50 is integrally formed with the central portion 42 and extends outward therefrom and is diametrically opposed to the first lateral wing member 45. The second lateral wing member 50 includes surface area 53 that provides an area for a portion of a human hand or finger. The engagement member 40 provides a technique for a user of the French press plunger rod assembly 100 to engage therewith and stabilize while rotatably removing the filter screen 25. While the engagement member 40 is illustrated herein having a first lateral wing member 45 and second lateral wing member 50, it is contemplated within the scope of the present invention that the French press plunger rod assembly 100 could have as few as one lateral wing member or more than two lateral wing members. Furthermore, it should be understood within the scope of the present invention that the first lateral wing member 45 and second lateral wing member 50 could be formed in alternate shapes and sizes and achieve the objective described herein. Additionally, it should be understood that the engagement member 40 could be located in any position on the shaft 10.

Mounted on the shaft 10 intermediate the second end 12 and the engagement member 40 is the flow member 70. The flow member 70 functions to provide a mixing of the fluid disposed within the interior volume 98 of the French press coffee pot 99. The mixing of the fluid, during utilization of the French press plunger rod assembly 100 provides an improved distribution of matter so as to be more consistent across the entire volume of the interior volume 98. The flow member 70 includes a plurality of blades 72 mounted to a hub 73 utilizing suitable techniques. The blades 72 extend outward from the hub 73 and are formed at a pitch to create a helical spiral like design. The blades 72 extend beyond the engagement member 40 and are operable to create a vortex flow within the interior volume 98 as the French press plunger rod assembly 100 is moved in a downward direction. As the French press plunger rod assembly 100 is pushed downward, the flow member 70 rotates and creates a flow around the axis of the shaft 10. This vortex flow provides a more normalized distribution of the fluid disposed within the interior volume 98. While the flow member 70 is illustrated herein as having a plurality of blades, it is contemplated within the scope of the present invention that the flow member 70 could have as few as one blade. Furthermore, while it is desired within the preferred embodiment of the present invention that the flow member 70 is rotatably mounted to the shaft 10, it is contemplated within the scope of the present invention that the flow member 70 could be secured to the shaft 10 so as to be stationary. Additionally, it is contemplated within the scope of the present invention that the flow member 70 could be provided in alternate shapes and sizes wherein the blades thereof would be configured in different shapes. The flow member 70 can be any size, any shape or any material that is suitable for creating a desired vortex flow pattern within the interior volume 98. It should be further understood within the scope of the present invention that the flow member 70 could be secured to shaft 10 at any location thereon.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A French press plunger assembly configured to be operably coupled with a French press coffee pot comprising:
    a shaft, said shaft having a first end and a second end, said shaft being manufactured from metal;
    a handle, said handle being secured to said first end of said shaft;
    a filter screen, said filter screen being removably secured to said second end of said shaft, said filter being annular in shape;
    an engagement member, said engagement member being immovably secured to said shaft, said engagement member having a central portion, said central portion being surroundably mounted to said shaft, said central portion having a first lateral wing member integrally formed therewith, said first lateral wing member extending outward from said central portion;
    a flow member, said flow member being mounted to said shaft, said flow member being between said engagement member and said second end of said shaft, said flow member having a hub, said hub having a plurality of blades extending outward therefrom; and
    wherein said flow member is mounted in a first technique and a second technique.

2. The French press plunger assembly as recited in claim 1, and further including a second lateral wing member, said second lateral wing member being integrally formed with said central portion, said second lateral wing member extending outward from said central portion.

3. The French press plunger assembly as recited in claim 1, wherein in said first technique of said flow member, said flow member is rotatably mounted to said shaft.

4. The French press plunger assembly as recited in claim 1, wherein in said second technique of said flow member, said flow member is stationary on said shaft.

5. The French press plunger assembly as recited in claim 2, wherein said flow member is configured to create a vortex flow in a fluid disposed in an interior volume of the French press coffee pot when the French press plunger assembly is moved in a downward direction.

* * * * *